(12) United States Patent
Forutanpour et al.

(10) Patent No.: US 8,954,099 B2
(45) Date of Patent: Feb. 10, 2015

(54) LAYOUT DESIGN OF PROXIMITY SENSORS TO ENABLE SHORTCUTS

(75) Inventors: Babak Forutanpour, Carlsbad, CA (US); Brian Momeyer, San Diego, CA (US); Kevin M. Beckwith, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 921 days.

(21) Appl. No.: 12/891,625

(22) Filed: Sep. 27, 2010

(65) Prior Publication Data

US 2011/0312349 A1 Dec. 22, 2011

Related U.S. Application Data

(60) Provisional application No. 61/355,452, filed on Jun. 16, 2010.

(51) Int. Cl.
*H04W 4/00* (2009.01)
*G06F 1/32* (2006.01)
(Continued)

(52) U.S. Cl.
CPC ...... *H04M 1/72522* (2013.01); *H04M 1/72558* (2013.01); *H04M 1/72552* (2013.01);
(Continued)

(58) Field of Classification Search
CPC ..... G06F 1/3231; G06F 1/1626; G06F 1/163; G06F 3/017
USPC .......... 348/158; 379/156, 158, 168, 169, 173; 396/429, 434; 455/424, 425, 550.1, 455/556.1, 556.2, 557, 575, 575.1, 575.2, 455/575.3, 575.4, 575.8, 41.1; 345/174, 345/158, 169, 173, 156; 340/539.13
See application file for complete search history.

(56) References Cited

U.S. PATENT DOCUMENTS 5,414,444 A * 5/1995 Britz .............................. 345/156
6,532,375 B2 * 3/2003 Cathey et al. ................. 455/574
(Continued)

FOREIGN PATENT DOCUMENTS

GB 2453121 A 4/2009

OTHER PUBLICATIONS

International Search Report and Written Opinion—PCT/US2011/040771—ISA/EPO—Nov. 2, 2011.
(Continued)

*Primary Examiner* — Mahendra Patel

(57) ABSTRACT

A mobile platform includes a plurality of proximity sensors coupled to a housing including on the sides, front and back of the housing. Signals from the proximity sensors are analyzed to determine configuration of the proximity sensors that are activated. The configuration may be a sequence of proximity sensors that are activated, e.g., when a gesture is detected, or the locations of the proximity sensors that are activated when the mobile platform is held in different manners. Mobile platform applications associated with the configuration are determined and automatically launched. For example, the applications may include a camera application or short message service (SMS) application, as well as controlling telephony operations, controlling a music player, and providing status information. Information from an orientation sensor and/or ambient light detector may also be used to assist in determining the applications to be launched.

57 Claims, 13 Drawing Sheets

(51) Int. Cl.
*G06F 3/01* (2006.01)
*G06F 1/16* (2006.01)
*H04M 1/725* (2006.01)

(52) U.S. Cl.
CPC .............. *G06F1/3231* (2013.01); *G06F 3/017* (2013.01); *H04M 2250/22* (2013.01); *Y02B 60/1289* (2013.01); *G06F 1/1626* (2013.01); *G06F 1/163* (2013.01)
USPC ....... 455/466; 455/566; 455/575.1; 455/41.1; 345/174; 345/158

(56) References Cited

U.S. PATENT DOCUMENTS

| | | | |
|---|---|---|---|
| 7,010,332 B1* | 3/2006 | Irvin et al. | 455/575.2 |
| 7,656,393 B2 | 2/2010 | King et al. | |
| 7,957,762 B2* | 6/2011 | Herz et al. | 455/550.1 |
| 8,000,736 B2* | 8/2011 | Forstall et al. | 455/550.1 |
| 8,295,879 B2* | 10/2012 | Alameh et al. | 455/556.1 |
| 2002/0167488 A1 | 11/2002 | Hinckley et al. | |
| 2003/0085870 A1 | 5/2003 | Hinckley | |
| 2004/0263484 A1* | 12/2004 | Mantysalo et al. | 345/173 |
| 2007/0075965 A1 | 4/2007 | Huppi et al. | |
| 2007/0259717 A1* | 11/2007 | Mattice et al. | 463/36 |
| 2008/0207254 A1 | 8/2008 | Pierce et al. | |
| 2009/0197615 A1* | 8/2009 | Kim et al. | 455/456.1 |
| 2009/0262078 A1 | 10/2009 | Pizzi | |
| 2010/0033424 A1* | 2/2010 | Kabasawa et al. | 345/156 |
| 2010/0062833 A1* | 3/2010 | Mattice et al. | 463/24 |
| 2010/0078343 A1* | 4/2010 | Hoellwarth et al. | 206/320 |
| 2010/0079395 A1* | 4/2010 | Kim et al. | 345/173 |
| 2010/0081473 A1* | 4/2010 | Chatterjee et al. | 455/559 |
| 2010/0083137 A1* | 4/2010 | Shin et al. | 715/756 |
| 2010/0090564 A1* | 4/2010 | Oh et al. | 310/328 |
| 2010/0099456 A1* | 4/2010 | Kim | 455/556.1 |
| 2010/0103098 A1* | 4/2010 | Gear et al. | 345/158 |
| 2010/0321289 A1* | 12/2010 | Kim et al. | 345/156 |
| 2011/0004826 A1* | 1/2011 | Cho et al. | 715/716 |
| 2011/0098061 A1* | 4/2011 | Yoon | 455/456.3 |

OTHER PUBLICATIONS

Capacitive Recognition of the Users Hand Grip Position in Mobile Handsets, S. Myilymaki et al., Progress in Electromagnetic Research B, vol. 22, 203-220 (2010).

* cited by examiner

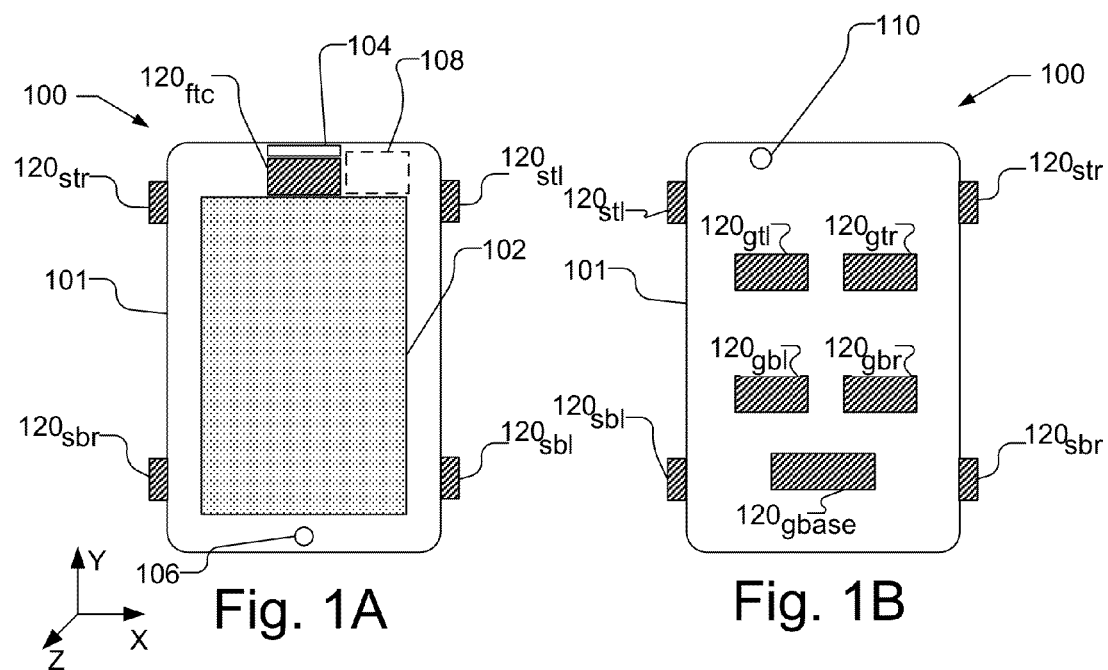
Fig. 1A  Fig. 1B
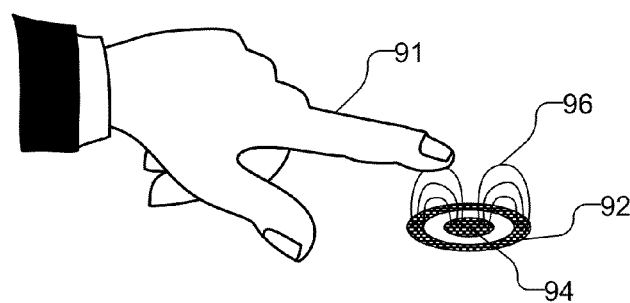
Fig. 2A
Fig. 2B

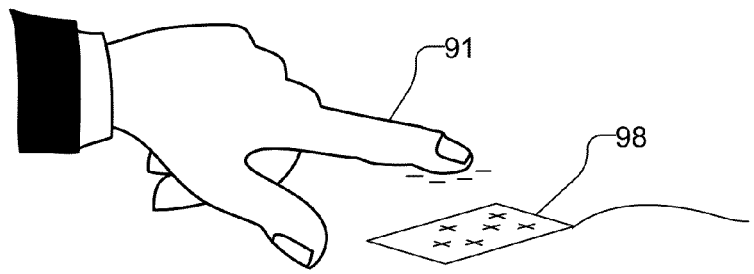
Fig. 2C
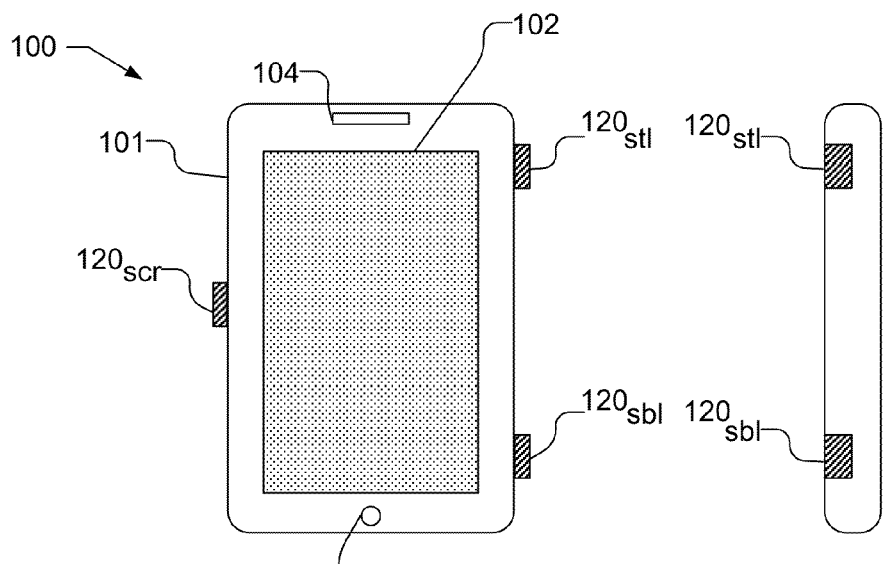
Fig. 3A        Fig. 3B
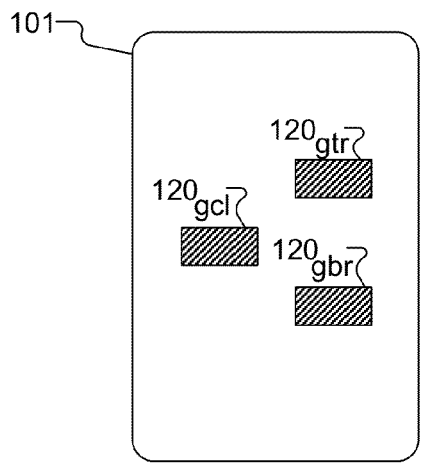   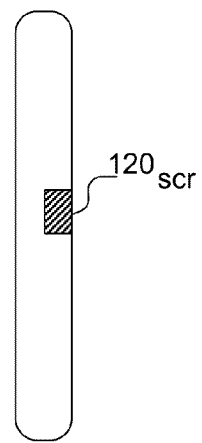
Fig. 3C        Fig. 3D

LAYOUT DESIGN OF PROXIMITY SENSORS TO ENABLE SHORTCUTS

CLAIM OF PRIORITY UNDER 35 U.S.C. §119

This U.S. Nonprovisional patent application claims the benefit of U.S. Provisional Patent Application No. 61/355,452, filed Jun. 16, 2010, which is assigned to the assignee hereof and expressly incorporated by reference herein.

BACKGROUND

Portable electronic devices, such as cellular telephones or smart phones, have become increasingly complex over time, adding many disparate features such as web browser, music (MP3) player, camera, texting, as well as serving as a telephone. The selection of these different functions typically require the user to navigate a user interface, which may include physical or virtual push buttons, as well as a display that requires that user's attention while selecting the desired function. Typical, such user interfaces are distracting, requiring the user's attention to make the appropriate selection and can be frustrating when the wrong function is inadvertently selected. Accordingly, an improved user-interface is desired.

SUMMARY

A mobile platform includes a plurality of proximity sensors coupled to a housing that are used to automatically detect how the user is holding the mobile platform or to detect gestures made near the mobile platform and to launch associate applications in response. For example, capacitive proximity sensors may be positioned at different locations on the housing, including the sides, front and back. Signals from the capacitive proximity sensors are analyzed to determine the configuration of the capacitive proximity sensors that are activated, e.g., by the user's finger or hand. The configuration may be a sequence of capacitive proximity sensors that are activated, e.g., when a gesture is detected, or the locations of the capacitive proximity sensors that are activated when the mobile platform is held. Mobile platform applications associated with the configuration are determined and automatically launched. For example, the applications may include a camera application or short message service (SMS) application, as well as controlling telephony operations, controlling a music player, and providing status information. Information from an orientation sensor and/or ambient light detector may also be used to assist in determining the applications to be launched.

BRIEF DESCRIPTION OF THE DRAWING

FIGS. 1A and 1B illustrate a front side and a back side, respectively, of a mobile platform with capacitive proximity sensors on the housing.

FIGS. 2A, 2B, and 2C illustrate different types of capacitive proximity sensors.

FIGS. 3A, 3B, 3C, 3D, and 3E illustrate a different configuration of proximity sensors that may be used on the front side, left side, back side, and right side, respectively, of the housing of the mobile platform.

DETAILED DESCRIPTION

Figure 3E:
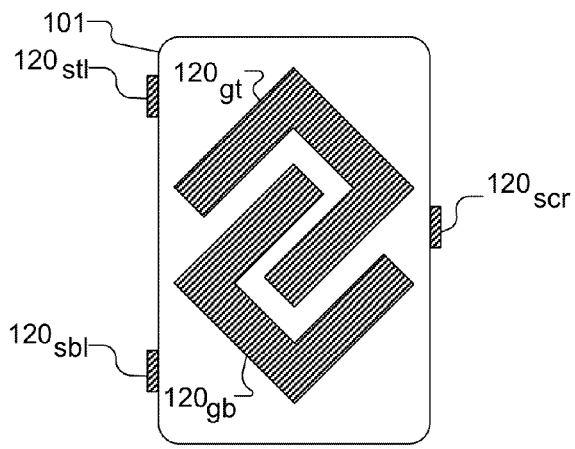

FIGS. 1A and 1B illustrate a front side and a back side, respectively, of a portable electronic device, referred to herein as a mobile platform 100. The mobile platform 100 is illustrated as including a housing 101 and a touch screen display 102 on the front, as well as a speaker 104 and microphone 106, which may be used when the mobile platform is a cellular telephone. The mobile platform 100 may include orientation sensor 108, such as accelerometers as well as a camera 110 or ambient light detector, shown in FIG. 1B. The mobile platform 100 further includes a plurality of proximity sensors, generally labeled 120, mounted on the housing 101 of the mobile platform. FIGS. 1A and 1B illustrate a plurality of proximity sensors 120, i.e., five sensors, mounted on the back side of the housing (proximity sensors labeled $120_{gtl}$, $120_{gtr}$, $120_{gbl}$, $120_{gbr}$, and $120_{gbase}$.). The mobile platform 100 is also shown as including two proximity sensors on the left side (when viewed from the back as illustrated in FIG. 1B) (proximity sensors labeled $120_{stl}$ and $120_{sbl}$) and two proximity sensors on the right side (proximity sensors labeled $120_{str}$ and $120_{sbr}$), and one proximity sensor on the front side (proximity sensors labeled $120_{ftc}$). FIG. 1A also illustrates X, Y, and Z axes of the mobile platform 100. As used herein, portrait and landscape refer to orientations of the mobile platform 100 when the Y axis and the X axis, respectively, are approximately aligned vertically, i.e., the direction of gravity. Moreover, as used herein, a horizontal orientation and a vertical orientation of the mobile platform 100 respectively refer to holding the mobile platform 100 with the Z axis approximately parallel with and perpendicular to the direction of gravity.

As used herein, a mobile platform refers to any portable electronic device such as a cellular or other wireless communication device, personal communication system (PCS) device, personal navigation device (PND), Personal Information Manager (PIM), Personal Digital Assistant (PDA), laptop or other suitable mobile device. The mobile platform may be capable of receiving wireless communication and/or navigation signals, such as navigation positioning signals. The term "mobile platform" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile platform" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile platform."

The proximity sensors 120 may be capacitive proximity sensors, such as Ultra Low Power Proximity (ULPP) by Ident Technology AG, in Germany, or Capacitive Sensing with MCU C8051F70x plus PCB traces by Silicon Laboratories, Inc., in Austin, Tex. Capacitive proximity sensors may create an electric field by alternating the charge on a conductive plate and use electrodes to measure disturbances in that field. For example, as illustrated in FIG. 2A, two electrodes 92 and 94 are used in the form of concentric circles. The electrodes 92 and 94 are oppositely charged to form a capacitor with an electrostatic field 96. When user 91 nears the electrodes 92 and 94, a disruption in the electrostatic field 96 can be detected. Other shapes of electrodes, as well as other relationships between the electrodes may be used. For example, FIG. 2B illustrates two separated electrodes 93 and 95 with field lines 97 between them. User 91 is detected when the user disrupts the electrostatic field 97. The sensitivity of the proximity sensor may be adjusted as desired to detect the presence of a user up to several inches away from the electrodes 93 and 94. However, it may be desirable to limit the sensitivity of the proximity sensors 120 used with mobile platform 100 to detect a user from 0-3 cm. As illustrated in FIG. 2B, the user 91 is detected when the user is near both of the electrodes 93 and 94. Thus, each electrode 93 and 95 acts as a proximity sensor, i.e., detecting the presence of the user 91 when near the electrode, however, both electrodes in the pair must be activated by the presence of the user 91 to "close the circuit" between the pair of electrodes in order to trigger a signal. Accordingly, the separated electrodes 93 and 95 are each sometimes referred to herein as proximity sensors. FIG. 2C illustrates an example of a surface capacitive proximity sensor that includes a single electrode 98 with a positive charge. When user 91 nears the electrode 98, the effect of the small negative charge on the user 91 on the positively charged electrode 98 can be detected. The electrodes can be created using wires, metallic foil, conductive paint, and other conductive material which can create an electrostatic field 96, which allows such system to be placed anywhere on the housing 101 of the mobile platform 100. Moreover, the electrodes may be placed inside the housing 101 or on a thin layer on the outside of the housing 101 so that the user cannot feel the electrodes of the proximity sensors 120. Thus, it should be understood that proximity sensors 120 are shown herein as objects raised from the housing 101 in order to illustrate possible placement of the proximity sensors 120 on the housing 101 and that the proximity sensors 120 in fact may not be seen or felt by a user.

When an object nears the surface, but not necessarily contacts the surface, the object serves as a dielectric and modifies the measured capacitance. Thus, objects such as human skin that pass through the field are detected and activate the capacitive proximity sensor. The closer the object comes to the electrodes, the greater the effect on the capacitive proximity sensor, but contact is not always necessary. Thus, objects such as fingers may be detected at a distance, e.g., 0-3 cm or more, from the capacitive proximity sensor. Moreover, with calibration, a conductive object, such as a finger, may be detected through clothing, plastic or similar materials, permitting detection of the object when the mobile platform 100 is held in a pocket or holder.

While capacitive proximity sensors are discussed herein, it should be understood that non-capacitive based proximity sensors may be used as well. For example, proximity sensors 120 may be based on light, such as infra-red based proximity sensors QuickSense™ Si1102 by Silicon Laboratories, Inc., temperature, sound, such as ultrasound, or pressure, e.g., such as push buttons. Thus, while proximity sensors 120 will sometimes referred to herein as capacitive proximity sensors, it should be understood that other types of proximity sensors may be used, unless specifically stated otherwise.

A different number of proximity sensors 120 or a different configuration of proximity sensors 120 on the housing 101 may be used if desired. For example, FIGS. 3A, 3B, 3C, and 3D illustrate a different configuration of proximity sensors 120 that may be used on the front side, left side, back side, and right side, respectively. As can be seen in FIG. 3A, the mobile platform 100 may have no proximity sensor mounted on the front side. If desired, the proximity sensors mounted on the left side (proximity sensors labeled $120_{stl}$ and $120_{sbl}$ in FIG. 3B) and the right side (proximity sensor labeled $120_{scr}$ in FIG. 3D) may have a slight forward bias so that the side proximity sensors 120 may be used for proximity sensing in the forward direction as well. Moreover, instead of five proximity sensors on the back side of the housing 101, as illustrated in FIG. 1B, only three proximity sensors (labeled $120_{gtr}$, $120_{gbr}$, and $120_{gcl}$) may be used, as illustrated in FIG. 3C. If desired, fewer proximity sensors or a different configuration of proximity sensors may be mounted on the back side of the housing 101 of the mobile platform 100, as illustrated by proximity sensors $120_{gt}$ and $120_{gb}$ in FIG. 3E. In the example shown in FIG. 3E, a vertical line gesture down the center of the mobile platform 100 would be detected as serial activation of proximity sensors $120_{gt}$, $120_{gb}$, $120_{gt}$, and $120_{gb}$, while a horizontal line gesture from left to right across the center of the mobile platform would be detected as activation of proximity sensor $120_{gb}$ followed by proximity sensor $120_{gt}$.

Figures 4A, 4B:
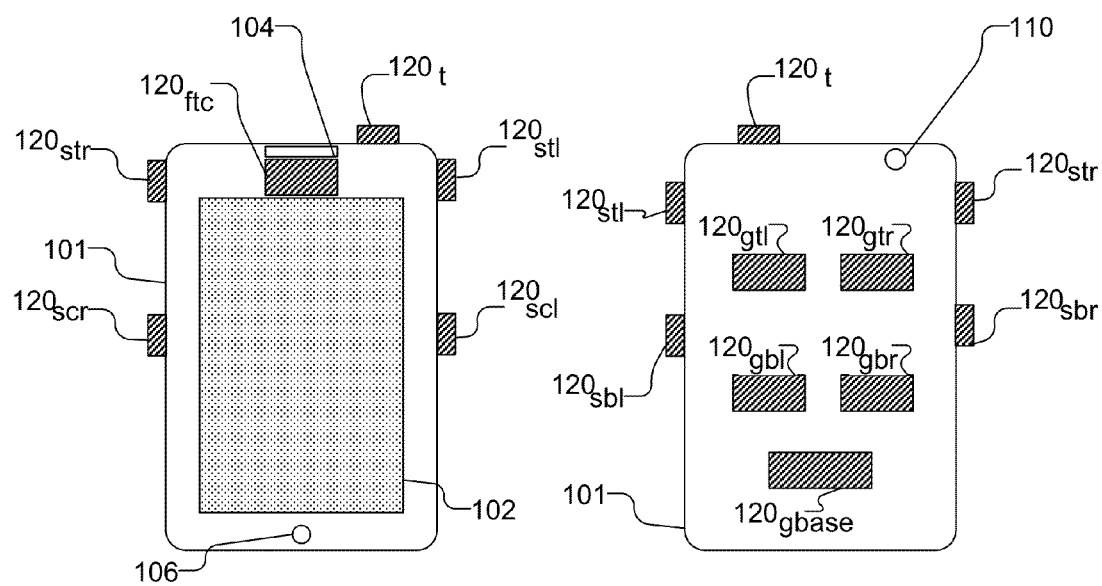
FIGS. 4A and 4B illustrate the front and back of a mobile platform with another configuration of proximity sensors that may be used on the front side and back side of the housing, respectively.

FIGS. 4A and 4B illustrate the front and back of a mobile platform 100 with another configuration of proximity sensors 120 that may be used on the front side and back side of the housing 101, respectively. As illustrated the proximity sensors $120_{str}$ and $120_{stl}$ may be positioned on the sides near the corners and proximity sensors $120_{scr}$ and $120_{scl}$ may be positioned on the sides near the center. If desired, an additional sensor may be included, such as a proximity sensor $120_t$ positioned on the top side of the mobile platform 100. The proximity sensor $120_t$ may be positioned at a location that is not near the camera 110, as illustrated in FIG. 4B, so that when a user activates proximity sensor $120_t$, the camera 110 is not blocked by the user's finger. The configuration of proximity sensors 120 that are activated may be used to quickly identify how the user wishes to use the mobile platform 100, e.g., in a camera application (or in any other configured application). For example, with the corner proximity sensors $120_{str}$ and $120_{stl}$ both activated, without activation of side proximity sensors $120_{scr}$ or $120_{scl}$, the mobile platform 100 is being held by at least the top corners, which is a normal way to hold a mobile platform during use as a camera in landscape mode. If the top proximity sensor $120_t$ is activated, without activation of corner proximity sensors $120_{str}$ or $120_{stl}$, the mobile platform 100 is being in a manner consistent with a camera application in portrait mode. Accordingly, when either the top proximity sensor $120_t$ is activated or the corner proximity sensors $120_{str}$ and $120_{stl}$ are both activated, without activation of other proximity sensors 120, the camera application may be automatically launched. Additionally, if the side proximity sensors $120_{scr}$ and $120_{scl}$ are activated, along with the front proximity sensor $120_{fic}$, the mobile platform is likely being used in a telephone type application, and appropriate applications or functions may be automatically launched, such as dimming or disabling the display 102, altering the ringer, etc.

Figures 5A, 5B:
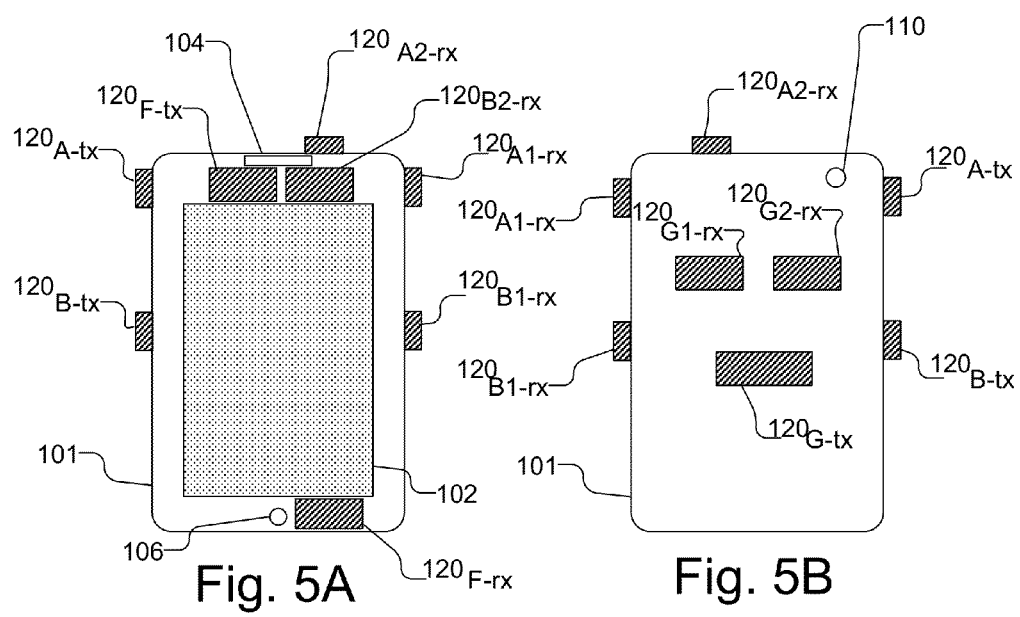
FIGS. 5A and 5B illustrate the front and back of a mobile platform with another configuration of proximity sensors that may be used on the front side and back side of the housing, respectively.

FIGS. 5A and 5B illustrate the front and back of a mobile platform 100 with another configuration of proximity sensors 120 that may be used on the front side and back side respectively. The proximity sensors illustrated in FIGS. 5A and 5B are similar to the capacitive proximity sensors illustrated in FIG. 2B. with the electrode plates of separated with one electrode labeled "-tx" and the electrode labeled "-rx". Each electrode acts as a proximity sensor, i.e., detecting the presence of the user's hand/finger at the electrode, however, both electrodes in the pair must be activated by the presence of the user to "close the circuit" between the pair of electrodes in order to trigger a signal. For example, in the center of both sides, electrodes forming proximity sensors $120_{B-tx}$ and $120_{B1-rx}$, are paired, while on the upper corners of the sides, electrodes forming proximity sensors $120_{A-tx}$ and $120_{A1-rx}$ are paired. Additionally, the electrode forming proximity sensor $120_{A2-rx}$ on the top corner may also be paired with proximity sensor $120_{A-tx}$, so that touching proximity sensor $120_{A-tx}$ along with either proximity sensor $120_{A1-rx}$ or $120_{A2-rx}$ will result in the triggering a signal. Similarly, the front of the housing 101 may include electrodes forming paired proximity sensors $120_{F-tx}$ and $120_{F-rx}$, which are paired, as well as another proximity sensor $120_{B2-rx}$, that is paired with proximity sensor $120_{B-tx}$, on the side of the housing 101. On the back side of the housing 101, as shown in FIG. 5B, one proximity sensor $120_{G-tx}$ is paired with both proximity sensors $120_{G1-rx}$ and $120_{G2-rx}$. Other combinations or pairs of proximity sensors are possible, for example, the back surface of the mobile platform may include additional proximity sensors. The benefit of the sensors shown in FIGS. 5A and 5B is that keys and coins in the pocket will not falsely activate the proximity sensors.

Figure 6:
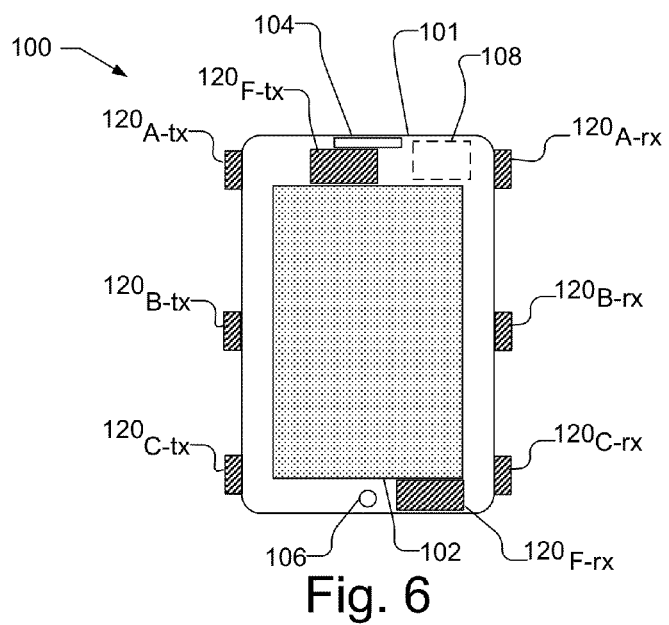
FIG. 6 illustrates another configuration of proximity sensors on the housing of the mobile platform.

FIG. 6 illustrates another configuration of proximity sensors 120 on the housing 101 of the mobile platform 100. FIG. 6 is similar to FIGS. 5A and 5B, with the electrodes for the proximity sensors separated, where each electrode acts as a proximity sensor, but requires the presence of the user's hand/finger at each electrode to trigger a signal. FIG. 6 illustrates paired proximity sensors on the same side i.e., left side and right side, of the housing 101 of the mobile platform 100. For example, paired proximity sensors $120_{A-tx}$, and $120_{A-rx}$ (sometimes collectively referred to as proximity sensors $120_A$) are located on the upper corners of the housing 101, while paired proximity sensors $120_{C-tx}$ and $120_{C-rx}$, (sometimes collectively referred to as proximity sensors 120) are located on the lower corners of the housing 101. If desired, additional proximity sensor pairs may be present, such as paired proximity sensors $120_{B-tx}$, and $120_{B-rx}$ (sometimes collectively referred to as proximity sensors $120_B$) located in the center of the sides and front proximity sensors $120_{F-tx}$, and $120_{F-rx}$ (sometimes collectively referred to as proximity sensors $120_F$). The back side may have a configuration of proximity sensors similar to that shown in FIG. 5B, or any other configuration, such as shown in FIG. 1B, 3C, or 3E. The configuration of proximity sensors 120 and, optionally, data from the orientation sensor 108 may be used together to quickly identify how the user wishes to use the mobile platform 100, e.g., in a camera application or in an SMS or texting type application (or in any other configured application) based on the configuration of activated proximity sensors 120. For example, with the corner proximity sensors $120_A$ and $120_C$ activated, without activation of side proximity sensors 120, it is known that the mobile platform 100 is being held by the corners, which is a normal way to hold a mobile platform during use as a camera or SMS application. With the addition of data from the orientation sensor 108, it can be determined if the mobile platform 100 is being used as a camera or for texting, i.e., if the mobile platform 100 is held approximately vertically (with the Z axis shown in FIG. 1A perpendicular to the direction of gravity), the mobile platform 100 is most likely being used as a camera, and if the mobile platform 100 is held approximately horizontally (with the Z axis shown in FIG. 1A parallel to the direction of gravity), the mobile platform 100 is most likely being used for texting. Accordingly, the camera or SMS applications can be automatically launched based on the configuration of activated proximity sensors 120. Which applications are launched in response to a particular configuration may be user configurable. For example, the camera application may be automatically launched when the mobile platform is held in one or both of landscape mode or portrait mode. It may be desirable to limit the automatic launch of the camera application to landscape mode to prevent an inadvertent launch of the camera application while, e.g., holding the mobile platform as a telephone. If desired, in camera mode, an image may be captured automatically after a pre-defined time, e.g., 3 seconds, so that the user does not need to remove a finger from the mobile platform 100. Additionally or alternatively, once the camera application or SMS application is launched, the mobile platform 100 may remain in the application for a pre-defined period of time, e.g., 3 seconds, after one or more of the proximity sensors 120 are deactivated, which permits a user to remove a finger from a proximity sensor 120 to interface with the mobile platform 100, e.g., to capture an image by tapping the display 102. If the side proximity sensors $120_C$ are activated along with the corner proximity sensors $120_A$ and $120_C$, then the mobile platform 100 is not held by the corners, and accordingly, the camera or SMS applications are not automatically launched.

Moreover, using multiple proximity sensors, e.g., on the back of the housing 101 as illustrated, e.g., in FIG. 1B, and by monitoring which proximity sensors 120 are activated and when (i.e., the order that the proximity sensors 120 are activated), gestures may be detected with the proximity sensors. For example, referring to FIG. 1B, a clockwise circle gesture can be detected when proximity sensors $120_{gtl}$, $120_{gtr}$, $120_{gbr}$, $120_{gbl}$ and $120_{gtl}$ are sequentially activated. Examples of possible gestures that may be detected using proximity sensors 120 on the back side of the housing 101 and examples of mobile platform 100 functions that may be associated with the gestures are shown in the following Table.

TABLE 1

Figure 8:
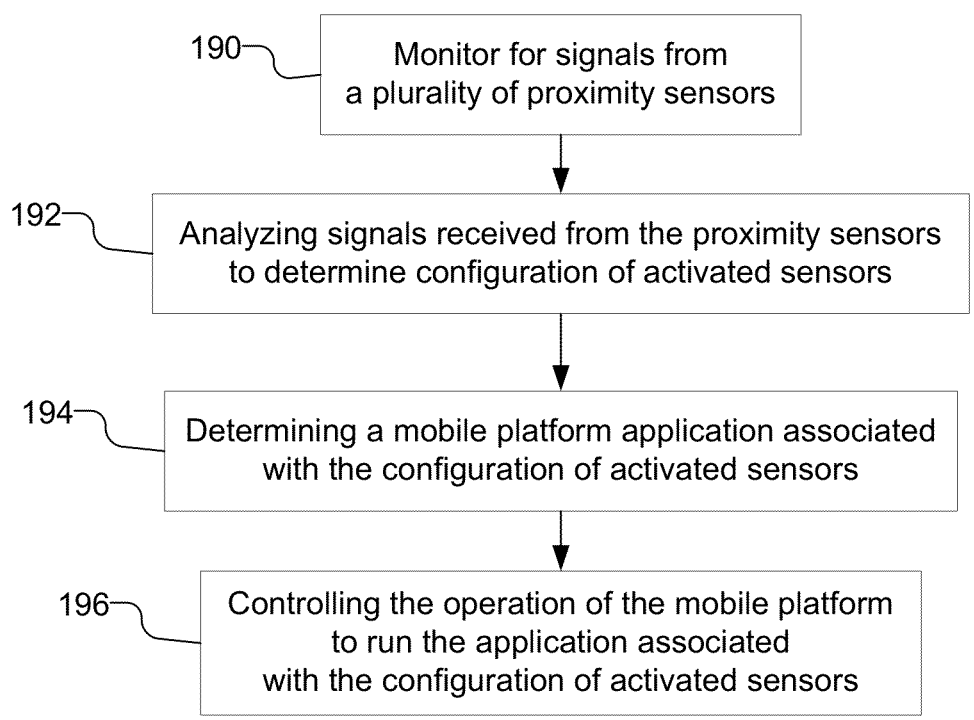
FIG. 8 is a flow chart illustrating using a plurality of capacitive proximity sensors on the housing of the mobile platform as a user interface to automatically control the operation of the mobile platform.

| Gesture | Function |
|---|---|
| Clockwise | Increase volume |
| Counter-Clockwise | Decrease volume |
| Swipe Up | Provide number of emails in inbox |
| Swipe Down | Provide number of SMSs |
| Swipe Left | Mute Call |
| Swipe Right | Answer Call |
| FIG. 8 | Email people with message, e.g., people attending current meeting that will be late |
| Letter "C" followed by additional gesture | Call person designated by additional gesture |

Figure 7:
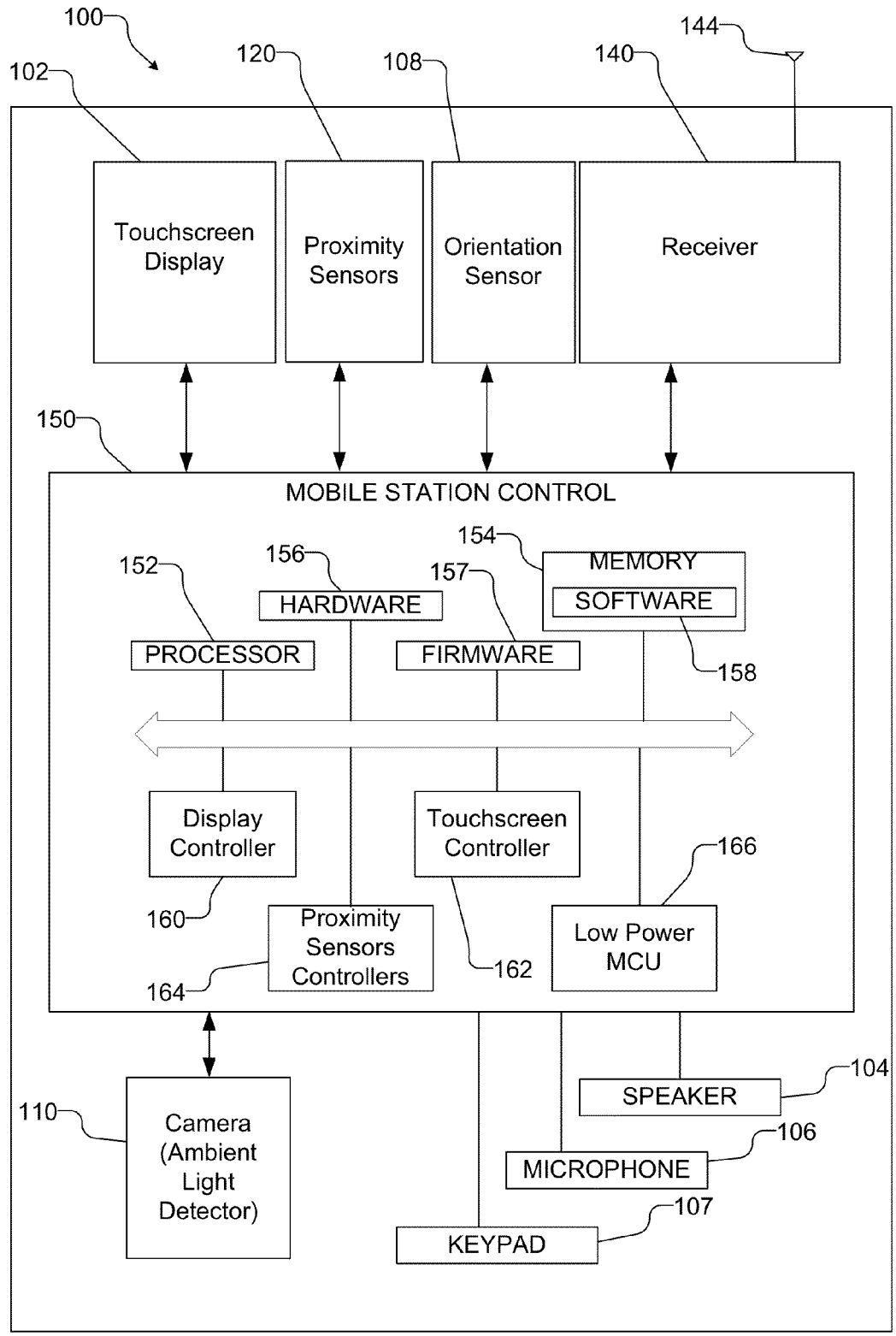
FIG. 7 is a block diagram of a mobile platform that may provide a user interface using proximity sensors.

FIG. 7 is a block diagram of a mobile platform 100 that may provide a user interface using proximity sensors. The mobile platform 100 includes a means for sensing gestures, such as proximity sensors 120, which may be multiple capacitive proximity sensors or other types of proximity sensors, mounted on the housing 101 of the mobile platform 100 as described above. The mobile platform 100 may also include a means for determining the orientation of the mobile platform 100, i.e., whether the mobile platform 100 is being held vertically, horizontally, in portrait mode, in landscape mode etc, such as orientation sensor 108, which may be, e.g., accelerometers and/or gyroscopes. Mobile platform 100 may also include a camera or ambient light detector 110. Mobile platform 100 may also include a wireless transceiver 140, which may be, e.g., a cellular modem or a wireless network radio receiver/transmitter that is capable of sending and receiving communications to and from a cellular tower. Mobile platform 100 also includes a user interface that includes a display 102, which may be a touch screen display, and may include a keypad 107 or other input device through which the user can input information into the mobile platform 100. In one embodiment, the keypad 107 may be integrated into the display 102, such as a touch screen display. The user interface may also include, e.g., a speaker 104 and microphone 106, e.g., when the mobile platform 100 is a cellular telephone. Additionally, the orientation sensor 108 may be used as the user interface by detecting user commands in the form of gestures.

The proximity sensors 120, orientation sensor 108, ambient light detector 110, display 102, and wireless transceiver 140 are connected to and communicate with a mobile platform control unit 150. The mobile platform control unit 150 accepts and processes data from the proximity sensors 120, orientation sensor 108, ambient light detector 110, display 102 and wireless transceiver 140 and controls the operation of the devices. The mobile platform control unit 150 may be provided by a processor 152 and associated memory 154, hardware 156, software 158, and firmware 157. The mobile platform control unit 150 may also include display controller 160 that controls the data shown on the display 102, a touch screen controller 162 that accepts data and controls the function of the touch screen function of the display 102 (if included), and a proximity sensor controller 164 that accepts data from and controls the function of the proximity sensors 120. Additionally, the mobile platform control unit 150 may include a low power microcontroller 166, which is coupled to the proximity sensors 120. The low power microcontroller 166 monitors the proximity sensors 120, e.g., while the mobile platform 100 is in low power mode, i.e., sleep mode, until proximity sensor 120 is activated. Once low power microcontroller 166 determines that a proximity sensor 120 is activated, the low power microcontroller 166 wakes the system to begin monitoring any other desired sensors that are more power intensive, such as the light detector 110, orientation sensor 108, touch screen display 102, etc. The controllers 160, 162, 164, 166 are illustrated separately from each other and processor 152 for clarity, but, it should be understood that one or more of the controllers may be combined or may be within the processor 152, implemented via software 158, hardware 156, or firmware 157. It will be understood as used herein that the processor 152 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

The methodologies described herein may be implemented by various means depending upon the application. For example, these methodologies may be implemented in hardware 156, firmware 157, software 158, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 154 and executed by the processor 152. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

For example, software 158 codes may be stored in memory 154 and executed by the processor 152 and may be used to run the processor and to control the operation of the mobile platform 100 as described herein. A program code stored in a computer-readable medium, such as memory 154, may include program code to determine a configuration of activated capacitive proximity sensors and to control the operation of the mobile platform based on the determined configuration including but not limited to any of the methodologies described herein. If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

With proximity sensors 120 configured on the housing 101 of the mobile platform 100, as described herein, many different functions or applications may be controlled based on which proximity sensors 120 are activated and when they are activated. For example, power saving functions are possible, such as placing the mobile platform 100 in low power mode (sleep mode) when the device is not held or awakening when held. Moreover, the intended use of the mobile platform 100 may be determined based on how the mobile platform 100 is being held (as determined by the activated proximity sensors 120 as well as orientation sensor 108, if desired) and running the appropriate application. Further, a user may be permitted to control device functions, such as volume control, answering phone, etc., while the mobile platform 100 is in the user's pocket or a holder. Cost savings can be achieved by eliminating other elements, such as an IR based proximity sensor to detect the user's ear during a telephone call or a mute button, which can be enabled based on the status and position of the mobile platform 100 as determined by the capacitive proximity sensors.

FIG. 8 is a flow chart illustrating using a plurality of proximity sensors on the housing of the mobile platform as a user interface to automatically control the operation of the mobile platform. As illustrated, signals from a plurality of proximity sensors coupled to a housing of a mobile platform are monitored (190). When signals are detected, indicated that one or more of the proximity sensors have been activated by the presence of, e.g., the user's hand or finger, the signals are analyzed to determine the configuration of the activated proximity sensors (192). The configuration of activated proximity sensors may be based on the location of the proximity sensors, e.g., proximity sensors located near the corners of the housing are activated indicating that the mobile platform is being used as a camera or in an SMS or texting application, or proximity sensors along the center of the sides and on the front of the housing are activated indicating that the mobile platform is being used as a phone. Other configurations are possible, including configurations that provide information with respect to the orientation of the mobile platform when held in the user's pocket or a mobile platform holder. Additionally, or alternatively, the configuration of activated proximity sensors may be based on the sequence of activation of the proximity sensors. For example, by determining the sequence that proximity sensors are activated on the back of the housing, simple gestures can be detected. Additionally, signals from other sensors, such as the orientation sensor 108 or light detector 110 may be analyzed. It is then determined if a mobile platform application is associated with the configuration of activated proximity sensors (194) and if so, the mobile platform is controlled to run the application associated with the configuration (196). Applications that may be run include a camera application or SMS application, as well as controlling telephony operation (e.g., answering or controlling the volume), controlling a music player (e.g., controlling the volume, changing songs, repeating), and providing status information (e.g., how many voice mails or emails). The applications that may be automatically launched in response to the configuration of activated proximity sensors may be user configurable.

By way of example, referring to FIG. 6, if the configuration of activated proximity sensors includes proximity sensors 120$_A$ and 120$_C$, but not of side proximity sensors 120$_B$, the configuration indicates that the mobile platform 100 is held by the corners. Typically, a mobile platform 100 is held by the corners during camera or SMS type applications. Thus, a camera application and/or SMS application may be associated with this configuration of activated proximity sensors. Additionally, data from other sensors, such as the orientation sensor may be used to assist in determining which application to run. For example, if the mobile platform 100 is held approximately horizontally (with the Z axis shown in FIG. 1A parallel to the direction of gravity), the SMS application may be associated with the configuration of activated proximity sensors. On the other hand, if the mobile platform 100 is held approximately vertically (with the Z axis shown in FIG. 1A perpendicular to the direction of gravity), the camera application may be associated with the configuration of activated proximity sensors. While running the camera (or any other desired) application, the mobile platform may continue to run the application despite a change in the configuration of activated proximity sensors. For example, in a camera application, the user may move a finger from a corner of the mobile platform 100 in order to manually capture an image, e.g., by tapping the touch screen display 102. Accordingly, the mobile platform 100 should remain in the camera mode until manually deactivated or for a pre-defined period of time, e.g., 3-5 seconds, which may be user configurable, which is sufficient for the user to complete the desired action and re-grip the mobile platform 100. Additionally, if desired, the camera application may include an automatic image capture, i.e., a counter internal to, e.g., processor 152, is automatically started along with the camera application and the image is captured after the elapse of a pre-defined period of time, e.g., 3 seconds, which may be user configurable. Thus, after launching the camera application in response to the configuration of activated proximity sensors, the mobile platform automatically captures an image without requiring user interaction. Thus, an image may be captured easily and quickly.

Another example, again referring to FIG. 6, is where the side proximity sensors 120$_{C-tx}$, 120$_{C-rx}$, and the front proximity sensors 120$_F$ are activated. In this configuration of activated proximity sensors, it is likely that a user is using the mobile platform 100 as a telephone. Thus, telephony type operations, such as controlling the volume or the ringer, or turning off the display or disabling the touch screen sensors, may be associated with this configuration of activated proximity sensors.

Figure 9:
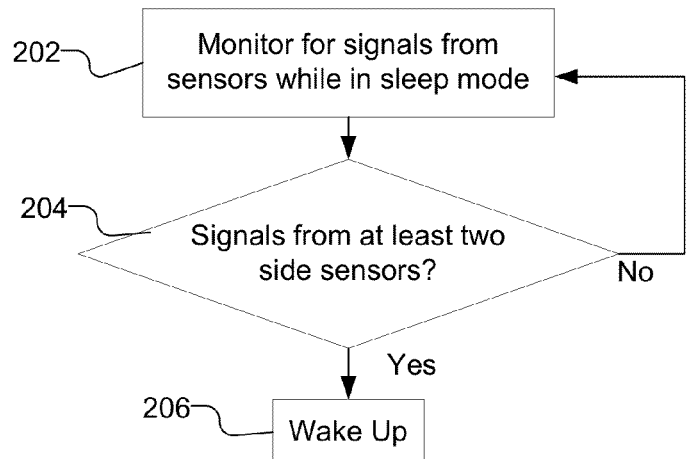
FIG. 9 is a flow chart illustrating a possible wake up function that may be implemented using the capacitive proximity sensors.

FIG. 9 is a flow chart illustrating a possible wake up function that may be implemented using the capacitive proximity sensors 120. As illustrated, while the mobile platform is in low power (sleep mode), signals from the proximity sensors 120 are monitored (202) e.g., using the low power microcontroller 166 shown in FIG. 7. If signals from at least two side sensors are detected (204) (e.g., $120_{sbl}$ and $120_{sbr}$ in FIG. 1A or $120_{scr}$ and $120_{sbl}$ in FIG. 3A, or $120_{scr}$ and $120_{scl}$ in FIG. 4A, $120_{B-tx}$ and $120_{B1-rx}$, in FIG. 5A, or $120_B$ in FIG. 6) the mobile platform wakes up (206), i.e., comes out of low power mode, otherwise, the mobile platform continues to monitor for signals from the proximity sensors 120.

Figure 10:
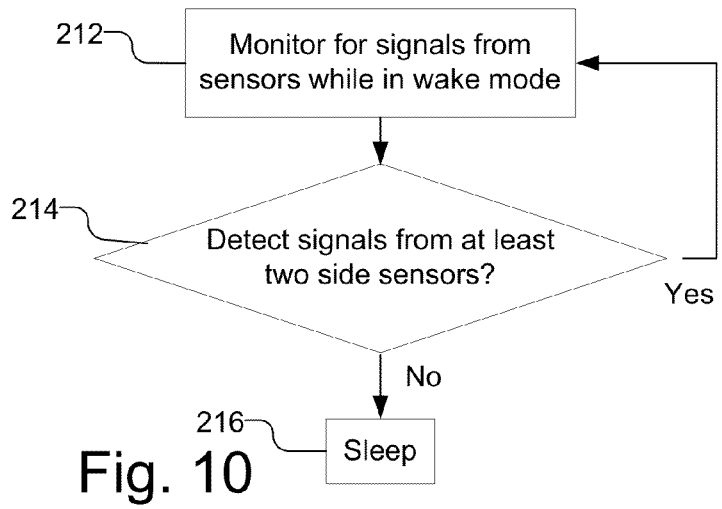
FIG. 10 is a flow chart illustrating a possible low power (sleep) function that may be implemented using the capacitive proximity sensors.

FIG. 10 is a flow chart illustrating a possible low power (sleep) function that may be implemented using the capacitive proximity sensors 120. As illustrated, while the mobile platform 100 is in wake mode, signals from the proximity sensors 120 are monitored (212). If signals from at least two side sensors are detected (214), the mobile platform remains in wake mode and continues to monitor signals from the proximity sensors 120; otherwise, the mobile platform goes into low power (sleep) mode (216). If desired, the sleep mode may be activated immediately when signals from the side sensors are no longer detected or after a designated amount of time, e.g., 5 seconds, 30 seconds, 1 minute, etc.

Figure 11:
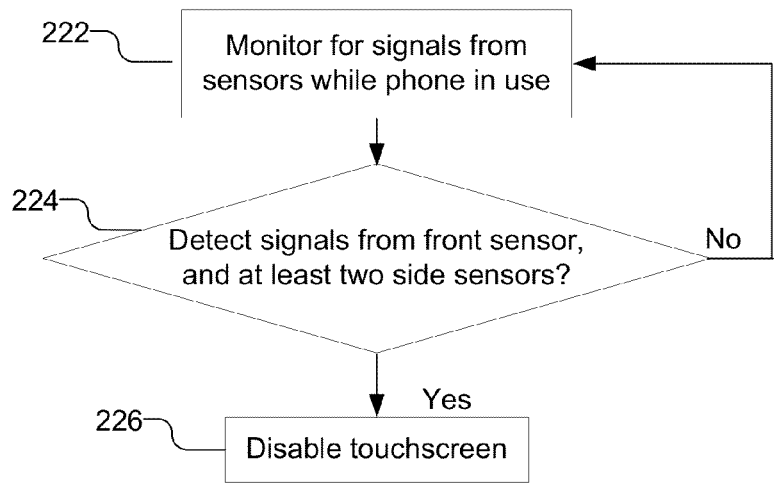
FIG. 11 is a flow chart illustrating a function in which the touch screen display is disabled based on signals from the capacitive proximity sensors.

FIG. 11 is a flow chart illustrating a function in which the touch screen display 102 is disabled based on signals from the capacitive proximity sensors 120, while the mobile platform is used as a phone. As illustrated, while the mobile platform 100 is in use, e.g., as a phone, signals from the proximity sensors 120 are monitored (222). If a signal is detected from the front proximity sensor, e.g., $120_{ftc}$ shown in FIG. 1A, (224), the touch screen display 102 is disabled (226). If desired, additional proximity sensors 120 may need to be activated to deactivate the touch screen display 102. For example, the touch screen display 102 may be disabled if signals are detected from a front proximity sensor as well as at least two side proximity sensors.

Figure 12:
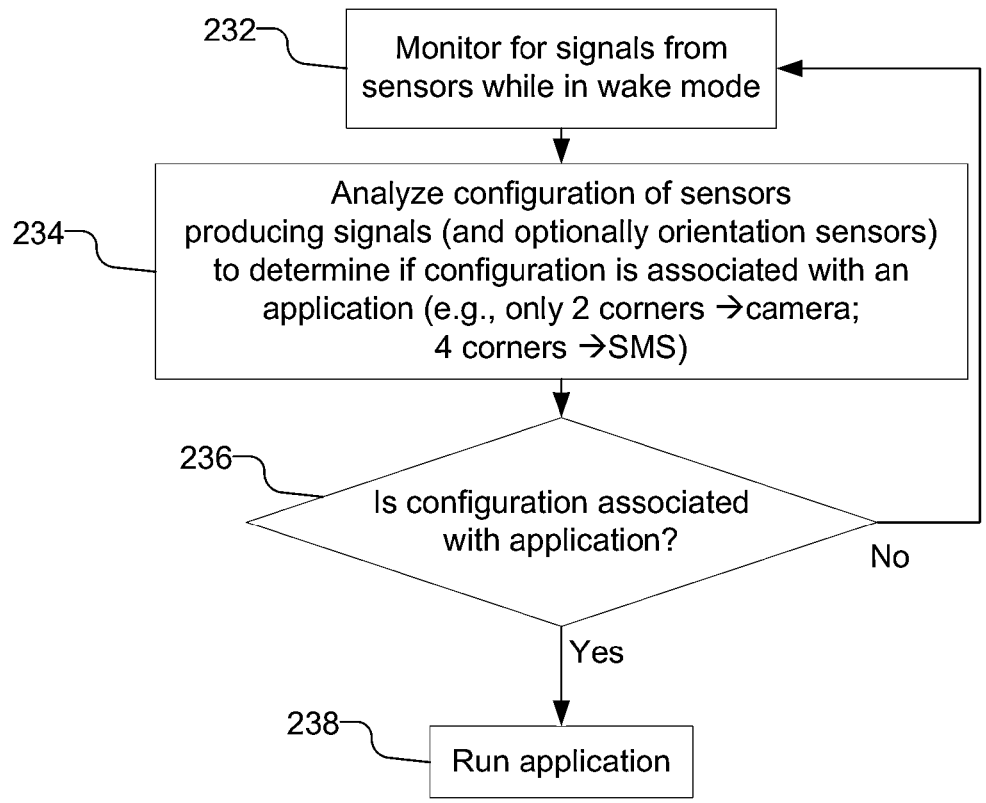
FIG. 12 is a flow chart illustrating controlling the operation of the mobile platform to run an application that is associated with a configuration of activated proximity sensors.

FIG. 12 is a flow chart illustrating controlling the operation of the mobile platform 100 to run an application that is associated with a configuration of activated proximity sensors 120. As illustrated, while the mobile platform 100 is in wake mode, signals from the proximity sensors 120 are monitored (232). If signals from proximity sensors 120 are received, i.e., proximity sensors are activated, the configuration of the activated proximity sensors 120 is analyzed to determine if the configuration is associated with an application (234). Additional information may be used as well, such as data from the orientation sensor 108, which may indicate the position that the mobile platform is held, i.e., vertically, horizontally, landscape, portrait, etc. For example, a camera application may be associated with the activation of the proximity sensors on the sides of the mobile platform (e.g., $120_{stl}$, $120_{sbl}$, $120_{str}$, and $120_{sbr}$ in FIG. 1A or proximity sensor $120_A$ and $120_C$ as shown in FIG. 6), while no other proximity sensors 120 are activated, and optionally, if the orientation sensor 108 indicates that the mobile platform 100 is held vertically in, e.g., landscape or portrait mode. If desired, the camera may be associated with only two proximity sensors 120 on the sides of the mobile platform 100 activated (one proximity sensor on each side) while in landscape mode, e.g., $120_{stl}$ and $120_{str}$ in FIGS. 1A and 4A or $120_{A-tx}$, and $120_{A1-rx}$, in FIG. 5A. Where four proximity sensors 120 on the sides are used, the camera application should not disable when the user removes a finger from a proximity sensor 120 to touch the touch screen display 102. If desired, when the mobile platform 100 is held vertically in portrait mode, as indicated by orientation sensor 108, activation of proximity sensors 120 on the top side along with activation of left and/or right side proximity sensors (e.g., proximity censors $120_t$, $120_{str}$, and $120_{stl}$ in FIG. 4A or proximity sensors $120_{A2-rx}$, $120_{A-tx}$ and (optionally $120_{A-rx}$) in FIG. 5A) may be associated with the camera application as well. Additionally, with information from the orientation sensor 108 indicating that the mobile platform 100 is held approximately horizontally in landscape (or portrait mode), along with activation of proximity sensors on the sides, such as $120_{stl}$, $120_{sbl}$, $120_{str}$, and $120_{sbr}$ in FIG. 1A or proximity sensors $120_A$ and $120_C$ as shown in FIG. 6, may launch an associated short message service (SMS) application. Additionally, or alternatively, the activation of another proximity sensor 120 on the back of the housing 101 of the mobile platform 100, along with the activation of the side proximity sensors 120, may be used to launch the SMS application without information from the orientation sensor 108. Referring back to FIG. 12, if the configuration of activated proximity sensors is associated with an application (236) that application is run (238) on the mobile platform 100, otherwise monitoring of the proximity sensors 120 is continued. Other applications to be automatically launched based on the configuration of activated proximity sensors may be used as well.

Figure 13:
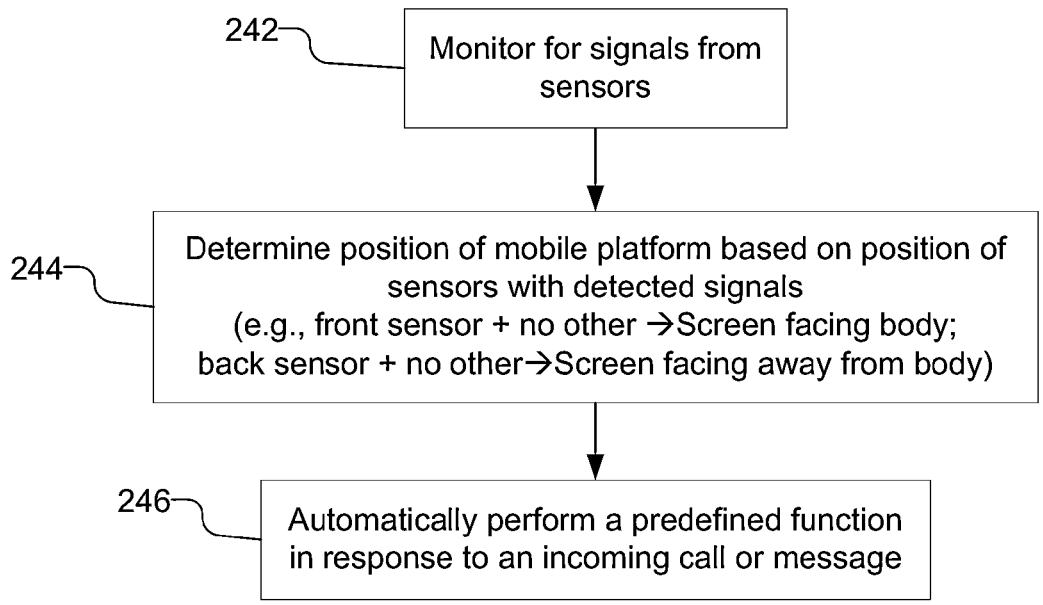
FIG. 13 is a flow chart illustrating an operation in which the mobile platform 100 can determine the position of the mobile platform in a low power mode based on the configuration of activated proximity sensors.

FIG. 13 is a flow chart illustrating an operation in which the mobile platform 100 can determine the position of the mobile platform 100, e.g., in a low power mode, based on the configuration of activated proximity sensors 120. The position of the mobile platform may be determined in response to a trigger event, such as a telephone call or incoming message, which brings the mobile platform out of a low power mode. Alternatively, the position of the mobile platform may be determined while in low power mode using, e.g., the low power microcontroller 166 shown in FIG. 7 to poll the proximity sensors 120 and write the results in memory 154, which may be obtained by the processor 152 in response to a trigger event. As illustrated, signals from the proximity sensors 120 are monitored (242), e.g., while the mobile platform 100 is in low power (sleep) mode or in response to a trigger event. The position of the mobile platform may be determined based on active proximity sensors (244). Additional information may be used as well, such as data from an ambient light detector 110 in FIG. 7, which may be used to indicate whether the mobile platform is held in a pocket. For example, if a front proximity sensor ($120_{ftc}$ in FIG. 1A) is activated and no other proximity sensors are activated, it is probable that the mobile platform 100 is held in a user's pocket or a holder with the front side, e.g., touch screen display 102, facing the user's body. If the ambient light detector 110 indicates little or no light (e.g., 10-15 lux), the certainty that the mobile platform 100 is held in a pocket is increased. Similarly, if the back proximity sensors ($120_{gtl}$, $120_{gtr}$, $120_{gbl}$, $120_{gbr}$, and $120_{gbase}$) are activated and no other proximity sensors 120 are activated, it is probable that the mobile platform 100 is held in a user's pocket or holder with the back side facing the user's body. Additionally, information from the orientation sensor 108 may be used to determine the orientation of the mobile platform 100 in the user's pocket, e.g., top up or top down. With the position of the mobile platform 100 identified, the mobile platform may automatically perform a predefined function in response to an incoming call or message or other stimulus (246). For example, if the mobile platform 100 is determined to be top-down in a pocket with the touch screen display 102 facing the user, the mobile platform 100 may behave as normal for incoming calls or messages. If, however, the device is top-down in a pocket, with the back of the mobile platform 100 facing the user, then all incoming calls may be sent directly to voice mail. If the mobile platform 100 is determined to be bottom-up in a pocket with the touch screen display 102 facing the user, then any incoming calls may be automatically answered with an SMS message, e.g., saying the user is in meeting. If the mobile platform 100 is determined to be bottom-up in a pocket and the back of the mobile platform 100 facing the user, incoming calls may be answered with a different SMS message, e.g., requesting that callers contact the user through a different means such as instant messaging. The predefined function that is performed in response to an incoming call or message, or other stimulus, may be user defined, along with the specific positions of the mobile platform 100 that are associated with each response.

Figure 14:
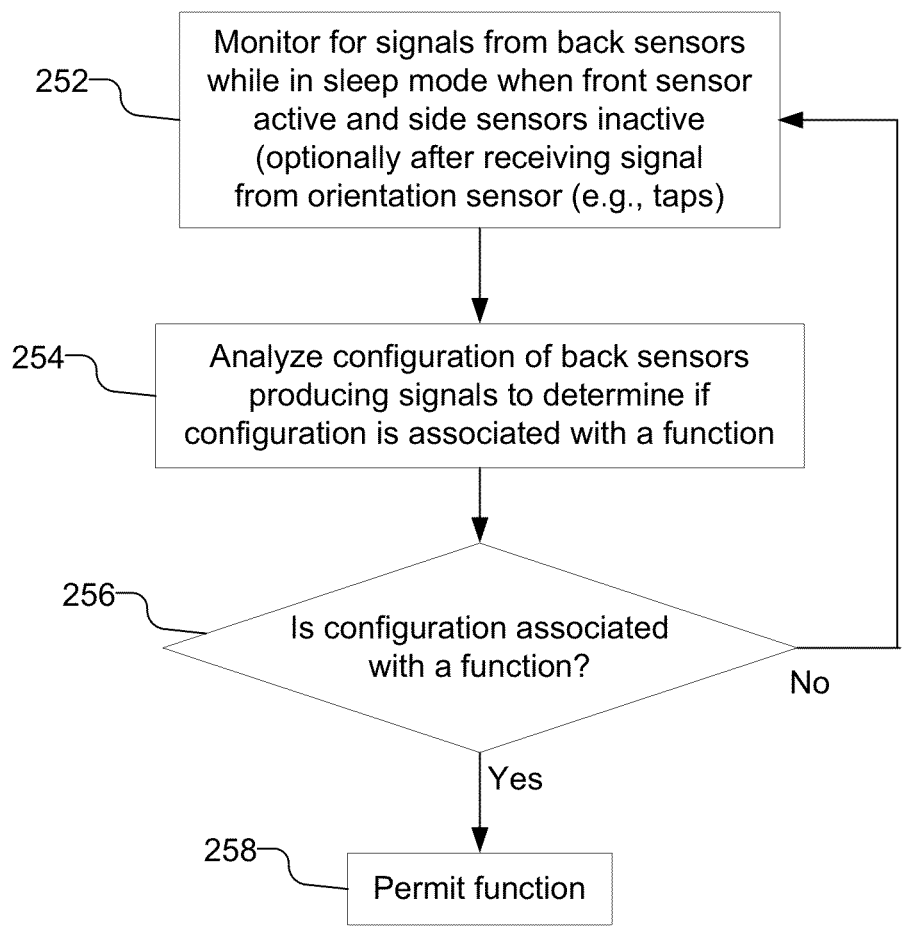
FIG. 14 is a flow chart that illustrates controlling the operation of the mobile platform 100 to run specific applications based on gestures detected by proximity sensors.
Figure 15:
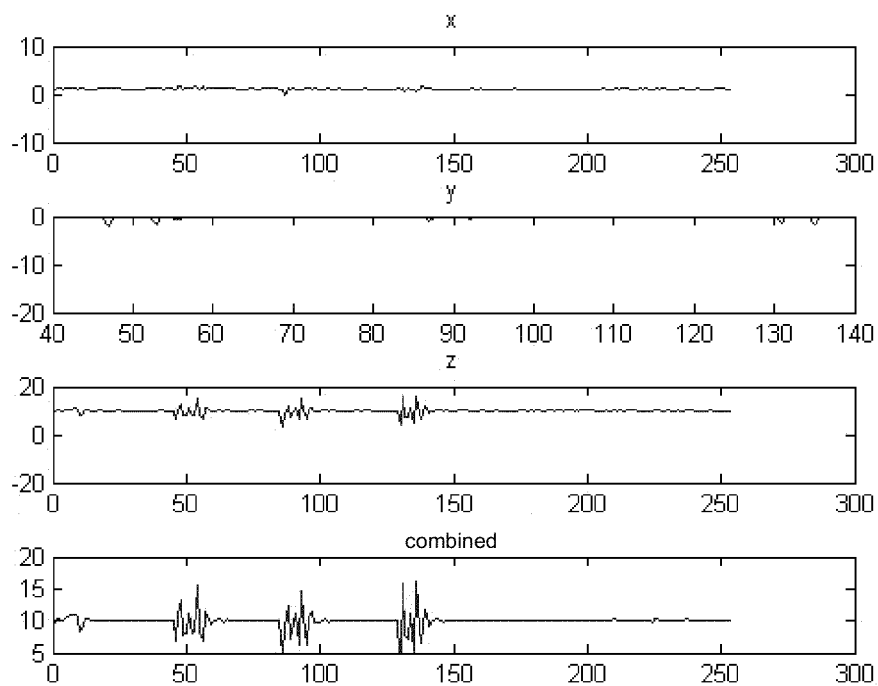
FIGS. 15 and 16, by way of example, illustrate the signature of such a sequence of taps, in which a user is sitting and standing, respectively, while the mobile platform is held in the user's pocket.
Figure 16:
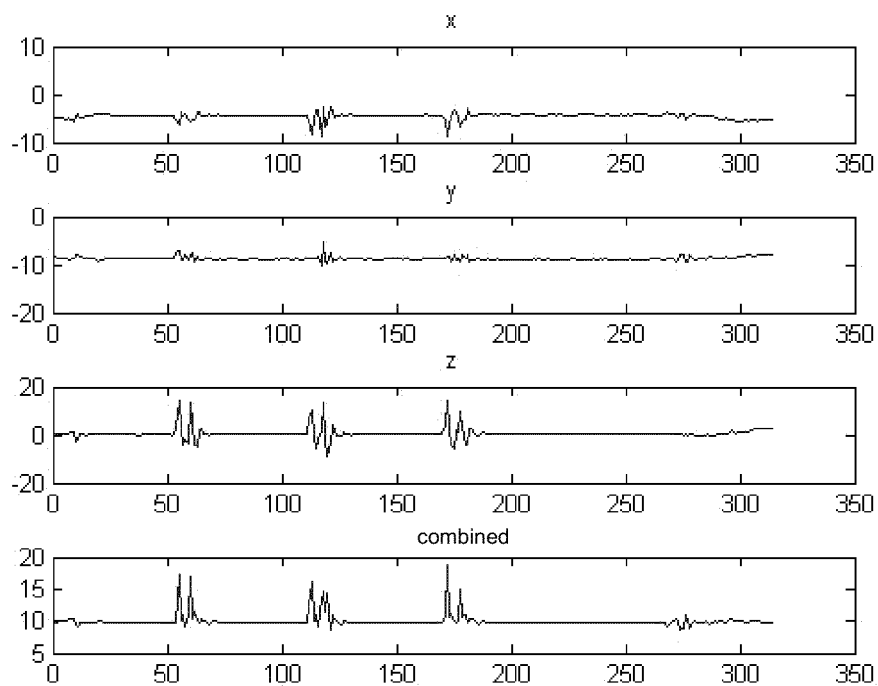

FIG. 14 is a flow chart that illustrates controlling the operation of the mobile platform 100 to run specific applications based on gestures detected by proximity sensors 120. As illustrated, signals from the proximity sensors 120 on the back of the mobile platform are monitored (252). If desired, monitoring of the back proximity sensors may be performed when the mobile platform is determined to in a user's pocket or holder with the touch screen display 102 facing the user, e.g., when the front proximity sensor is active and optionally the ambient light detector 110 indicates little or no light (e.g., 10-15 lux), as discussed above. Moreover, if desired, monitoring of the back proximity sensors may be performed in response to a trigger event, such as when a predefined signal from the orientation sensors is received, e.g., the user taps the mobile platform in a specific sequence that is detected by orientation sensor 108 or one or more of the proximity sensors 120. Taps, for example, may be a pre-designated sequence of taps, such as three sets of two taps. FIGS. 15 and 16, by way of example, illustrate the signature of such a sequence of taps, in which a user is sitting and standing, respectively, while the mobile platform 100 is held in the user's pocket. FIGS. 15 and 16 each include four graphs illustrating the magnitude of acceleration over time in planes defined by the X axis (width of the mobile platform), Y axis (height of the mobile platform), Z axis (depth of the mobile platform) (as illustrated in FIG. 1A, and combined axes. The predefined signal from the orientation sensor 108 may be detected using, e.g., a 40 Hz, sample rate from a 3-axis accelerometer, where: 1) a number of samples N have low motion, 2) a smaller number of samples M have high motion, and 3) the magnitude in the Z axis during a tap portion is at least 3× greater than the magnitude on any other axis. Low motion may be determined, e.g., when the magnitude on each of the X, Y, and Z axes is less than a baseline for each of the axes determined over a time period, such as 2-60 seconds. High motion may be determined, e.g., when the magnitude of the combined axes, i.e., sqrt($X^2+Y^2+Z^2$) crosses a threshold, e.g., 12 m/s$^2$, a desired number of times, e.g., more than 2 times.

Figure 17:
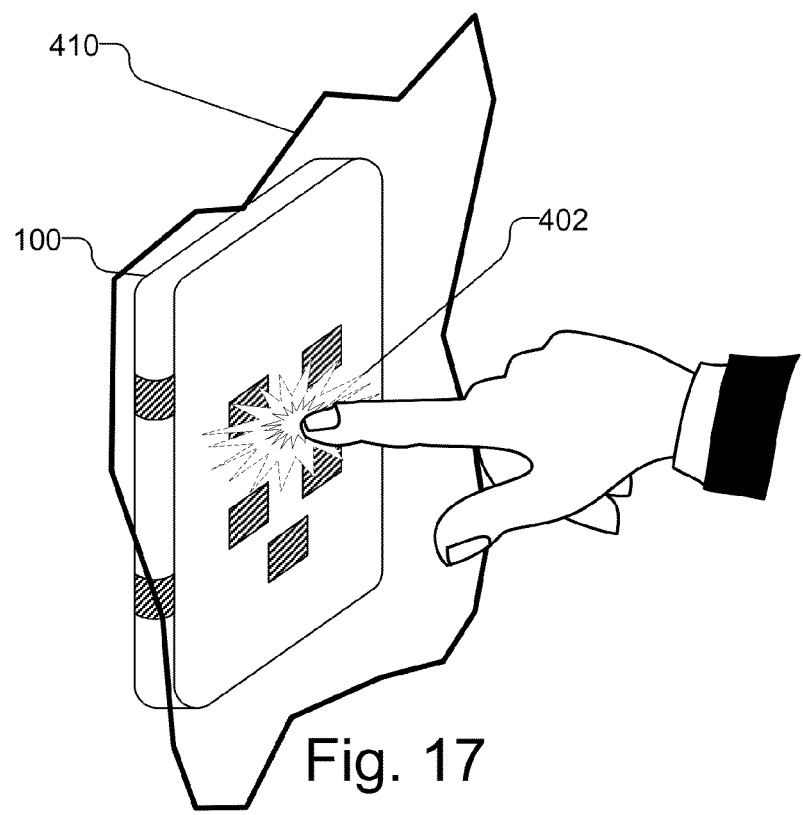
FIG. 17 illustrates a user double tapping the mobile platform through a protector, such as fabric or plastic that may be part of a pocket or mobile platform holder.

FIGS. 15 and 16 show that a sequence of three sets of double taps can be clearly identified and used to prompt gesture monitoring. Moreover, a sequence of three sets of double taps avoids false positives that may be caused by normal activity while the mobile platform is in the user's pocket. FIG. 17 illustrates a user double tapping 402 the mobile platform 100 through a protector 410, such as fabric or plastic that may be part of a pocket or mobile platform holder. If desired, a proximity sensor, e.g., $120_{gbase}$, may be required to be activated in order to monitor for gestures. In the embodiment shown in FIG. 5B, $120_{G-tx}$ must be used in conjunction with $120_{G1-rx}$, and $120_{G2-rx}$. The use of $120_{gbase}$ (or $120_{G-tx}$) is beneficial as it can be used to hold the mobile platform stationary during gesturing and the user can determine the relative position of the mobile platform.

Figure 18:
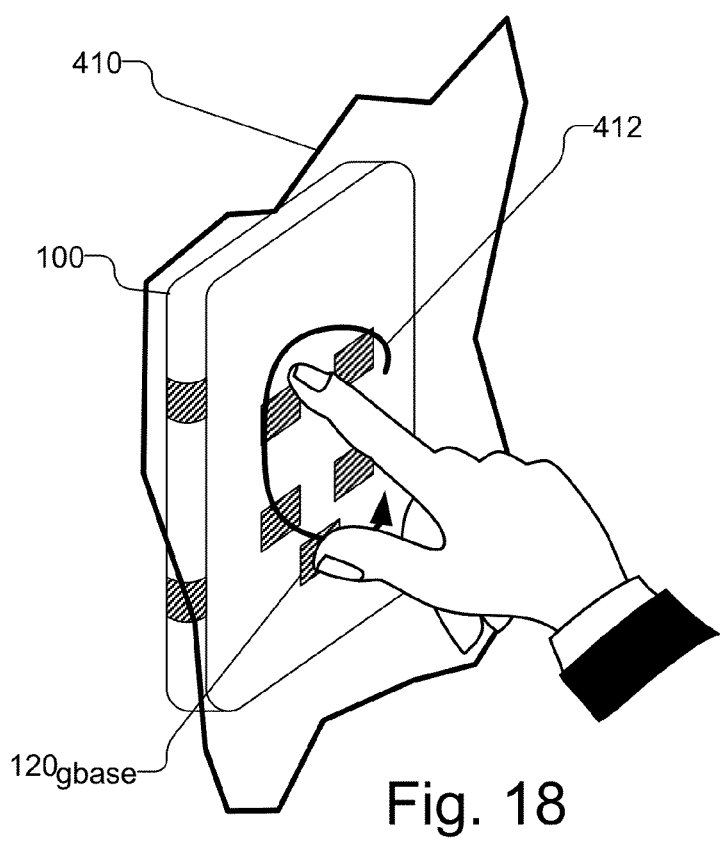
FIG. 18 illustrates a user producing a counter-clockwise "C" gesture over the mobile platform through a protector, such as fabric or plastic that may be part of a pocket or mobile platform holder.

The user may produce a gesture over the mobile platform without touching the mobile platform, if desired, with a hand or one or more fingers or other object that will activate the capacitive proximity sensors. The proximity sensors are activated by the presence of the user's fingers and transmit appropriate signals. The signals that are received from the proximity sensors are analyzed to determine the gesture produced, e.g., by determining the configuration of activated proximity sensors including the positions of the proximity sensors and the order in which they are activated. For example, gestures that may be detected include a clockwise circle, counter-clockwise circle, FIG. 8, vertical lines, horizontal lines, and large letters, depending on the positions and number of proximity sensors. FIG. 18, by way of example, illustrates a user producing a counter-clockwise "C" gesture 412 over the mobile platform 100 through a protector 410, such as fabric or plastic that may be part of a pocket or mobile platform holder, while activating proximity sensor $120_{gbase}$. The configuration of activated proximity sensors 120, i.e., the positions of the proximity sensors 120 and the order in which they are activated, is analyzed to determine if the configuration is associated with a function (254). If the configuration is associated with a function (256), the function is permitted and is performed or launched (258); otherwise, the mobile platform 100 continues to monitor for signals from the proximity sensors. By way of example, as described in Table 1 above, the volume of the mobile platform may be increased by producing a clockwise circle or decreased with a counter-clockwise circle. The mobile platform may skip to the next song with a swipe in one direction, or re-play the last song with a swipe in another direction. Of course, other gestures and applications may be used, including controlling telephony operation, controlling a music player, and providing status information.

Figure 19:
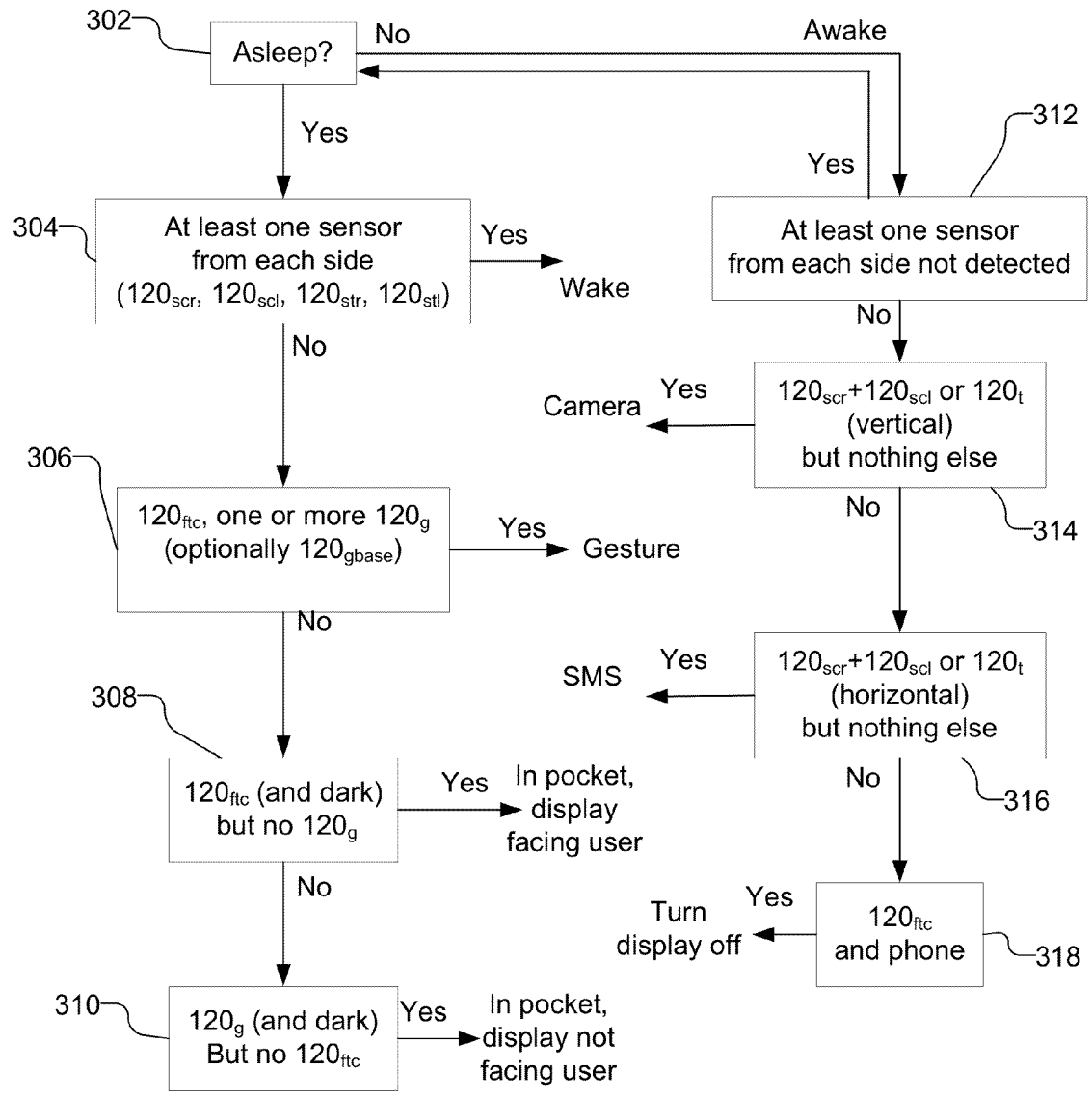
FIG. 19 is a state diagram illustrating one possible analysis of the proximity sensors and the function or operation associated with the different configurations.

If desired, one or more of the above described processes may be combined. For example, FIG. 19 is a state diagram illustrating one possible analysis of the proximity sensors 120 (as illustrated in FIGS. 4A and 4B) and the function or operation associated with the different configurations of activated proximity sensors 120. As illustrated, while the mobile platform is asleep (302) if at least one proximity sensor 120 is activated on each side, e.g., $120_{scr}+120_{scl}$ or $120_{str}+120_{stl}$ or some combination thereof, the mobile platform 100 is awoken (304). Otherwise, if the front proximity sensor, e.g., 120, is activated and one or more of the back sensors (collectively referred to as $120_g$) are activated (and optionally requiring activation of $120_{gbase}$), the mobile platform 100 detects gestures (306). Otherwise, if the front proximity sensor, e.g., $120_{ftc}$, is activated, but no back sensor $120_g$ is activated (nor are the side sensors activated or the mobile platform will wake as per state 304) and optionally requiring that the ambient light detector 110 indicates little or no light, the mobile platform 100 is identified as being in a pocket with the display 102 facing the user (308). Otherwise, if one or more back sensors $120_g$ are activated and the front side proximity sensor $120_{ftc}$ is not activated and optionally the ambient light detector 110 indicates little or no light, the mobile platform is identified as being in a pocket with the display 102 facing away from the user (310).

When the mobile platform is awake, if at least one proximity sensor from each side is not activated, the mobile platform is put in low power (sleep) mode (312), which may occur immediately or after a desired time delay. If the top proximity sensors ($120_{scr}$ and $120_{scl}$) are activated or the top side proximity sensor $120_t$ is activated while the mobile platform 100 is held in an approximately vertical orientation, i.e., the Z axis is approximately perpendicular to the direction of gravity, in either landscape or portrait orientations, and no other proximity sensors are activated, the mobile platform 100 activates the camera application (314). If the top proximity sensors ($120_{scr}$ and $120_{scl}$ are activated or the top side proximity sensor $120_t$ is activated while the mobile platform 100 is held in an approximately horizontal orientation, i.e., the Z axis is approximately perpendicular to the direction of gravity, in either landscape or portrait orientations, and no other proximity sensors are activated, the mobile platform 100 activates the SMS application (316). If not, and the front proximity sensor $120_{ftc}$ is activated and the phone is in use, the display 102 is turned off (318).

Figure 20:
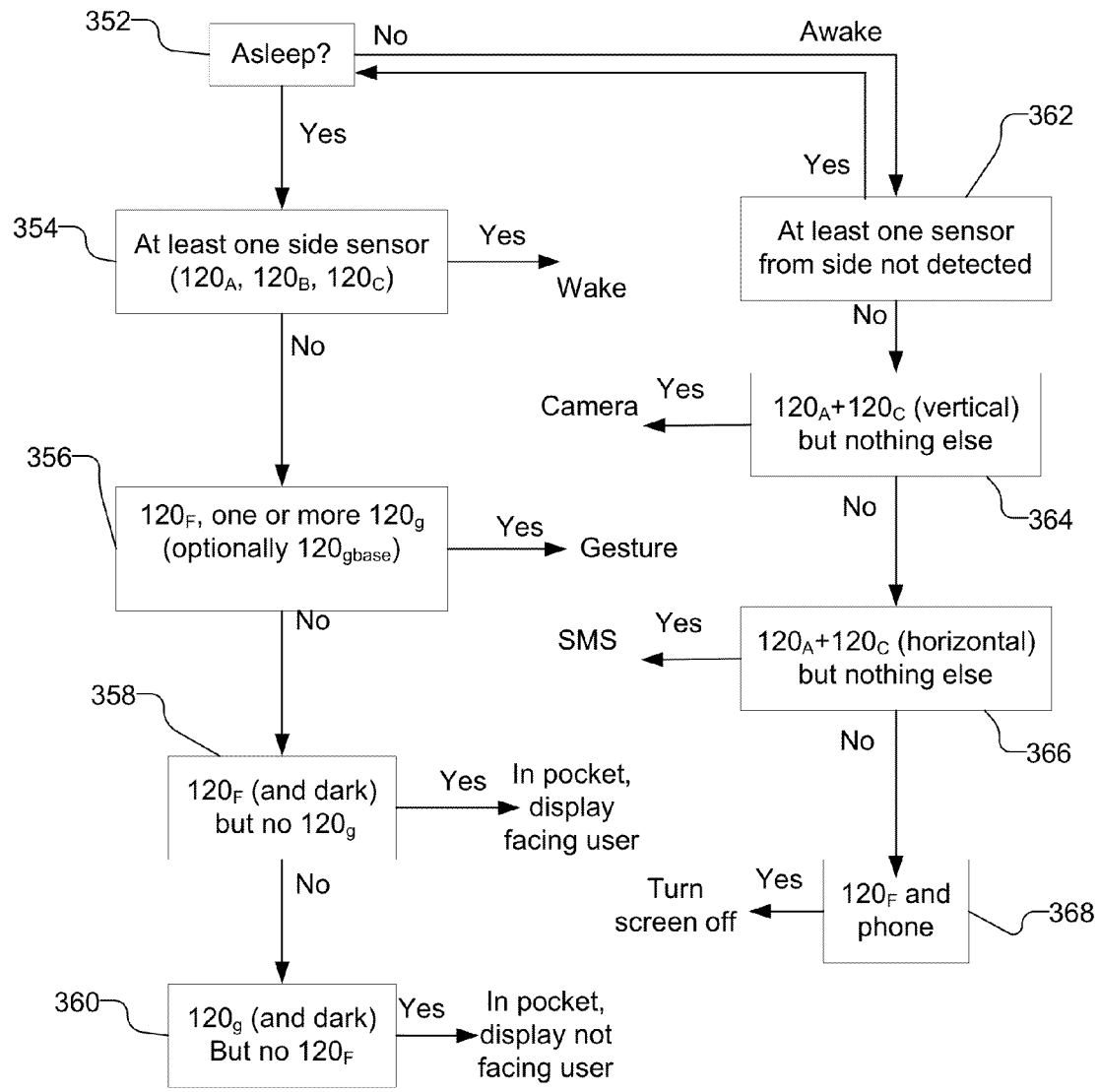
FIG. 20 is similar to FIG. 19, but shows a state diagram illustrating a possible analysis of the configurations of proximity sensors shown in FIG. 6 and the function or operation associated with the different configurations.

FIG. 20 is similar to FIG. 19, but shows a state diagram illustrating a possible analysis of the configurations of proximity sensors 120 shown in FIGS. 5A and 5B and the function or operation associated with the different configurations. As illustrated, while the mobile platform is asleep (352), if at least one pair of proximity sensors 120 on the side is activated, e.g., $120_A$, $120_B$ or $120_C$ or some combination thereof, the mobile platform 100 is awoken (354). Otherwise, if the front proximity sensors, e.g., $120_F$, are activated and one or more of the back sensors (illustrated in FIG. 1B and collectively referred to as $120_g$) are activated (and optionally requiring activation of $120_{gbase}$), the mobile platform 100 detects gestures (356). Otherwise, if the front proximity sensors, e.g., $120_F$, are activated, but no back sensor $120_g$ is activated (nor are the side sensors activated or the mobile platform will wake as per state 354) and optionally requiring that the ambient light detector 110 indicates little or no light, the mobile platform 100 is identified as being in a pocket with the display 102 facing the user (358). Otherwise, if one or more back sensors $120_g$ are activated and the front side proximity sensor $120_F$ is not activated and optionally the ambient light detector 110 indicates little or no light, the mobile platform is identified as being in a pocket with the display 102 facing away from the user (360).

When the mobile platform 100 is awake, if at least one pair of proximity sensors on the sides is not activated, the mobile platform is put in low power (sleep) mode (362), which may occur immediately or after a desired time delay. If the corner proximity sensors ($120_A$ and $120_C$) are activated while the mobile platform 100 is held in an approximately vertical orientation, i.e., the Z axis is approximately perpendicular to the direction of gravity, in either landscape or portrait orientations as determined by the orientation sensor 108, and no other proximity sensors are activated (e.g., proximity sensors $120_B$ are not activated), the mobile platform 100 activates the camera application (364). If the corner proximity sensors ($120_A$ and $120_C$) are activated while the mobile platform 100 is held in an approximately horizontal orientation, i.e., the Z axis is approximately parallel to the direction of gravity, in either landscape or portrait orientations as determined by the orientation sensor 108, and no other proximity sensors are activated, the mobile platform 100 activates an SMS camera application (366). If not, and the front proximity sensors $120_F$ are activated while the phone is in use, the display 102 is turned off (368).

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A mobile device comprising:
   a housing having a front, back, first side, second side, top side and a bottom side;
   a touch screen display on the front of the housing;
   a plurality of proximity sensors coupled to the housing, each proximity sensor is activated when an object passes through a field produced by the proximity sensor, the plurality of proximity sensors having a configuration on the housing, the configuration comprising:
      at least one proximity sensor mounted on the first side and at least one proximity sensor mounted on the second side;
      at least one proximity sensor mounted on the back of the housing;
   a processor connected to the plurality of proximity sensors;
   memory connected to the processor;
   software held in the memory and run in the processor to:
      determine a configuration of activated proximity sensors;
      determine a power mode of the mobile device;
      if the power mode of the mobile device is a lower power mode than awake, determine a function to be performed by the mobile device based at least in part on the configuration of activated proximity sensors and the power mode, wherein the function comprises performing a telephony operation, performing a music player operation, launching an application, performing a camera application operation, performing a texting application operation, performing an email application operation, providing status information of the mobile device or any combination thereof; and
      control the mobile device by performing the determined function.

2. The mobile device of claim 1, wherein the plurality of proximity sensors detect finger movement through a protective element.

3. The mobile device of claim 2, wherein the protective element is a pocket of a garment or a mobile device holder.

4. The mobile device of claim 1, wherein the configuration on the housing of the plurality of proximity sensors further comprises at least one proximity sensor mounted on the front of the housing.

5. The mobile device of claim 4, wherein the software held in the memory and run in the processor further causes the processor to determine an orientation of the mobile device when in a pocket of a garment based on the configuration of activated proximity sensors and wherein to determine a function is further based at least in part on the orientation.

6. The mobile device of claim 5, further comprising an orientation sensor and an ambient light detector, the processor connected to receive signals from the orientation sensor and the ambient light detector, wherein the software held in the memory and run in the processor further causes the processor to determine the orientation of the mobile device using signals from the orientation sensor and to determine a light level from the signals from the ambient light detector and to determine that the mobile device is in the pocket when the light level is less than a threshold.

7. The mobile device of claim 4, wherein the configuration of activated proximity sensors includes the at least one proximity sensor mounted on the front of the housing being activated, and the processor disables the touch screen display based on the configuration of activated proximity sensors.

8. The mobile device of claim 1, wherein there are at least two proximity sensors mounted on the first side and wherein the at least one proximity sensor mounted on the second side is mounted at approximately a center of the second side with respect to the top side and bottom side.

9. The mobile device of claim 1, wherein there are at least two proximity sensors mounted on the first side and at least two proximity sensors mounted on the second side.

10. The mobile device of claim 1, wherein at least one of the plurality of proximity sensors comprises a first electrode and a second electrode mounted at separate locations on the housing.

11. The mobile device of claim 1, wherein the configuration on the housing of the plurality of proximity sensors further comprises a plurality of proximity sensors mounted on the back of the housing.

12. The mobile device of claim 11, wherein the software held in the memory and run in the processor to determine the configuration of activated proximity sensors causes the processor to determine a sequence of activation of the plurality of proximity sensors mounted on the back of the housing, and the software held in the memory and run in the processor to control the mobile device based on the sequence of activation of the plurality of proximity sensors mounted on the back of the housing.

13. The mobile device of claim 12, wherein the software held in the memory and run in the processor to determine the configuration of activated proximity sensors causes the processor to determine the sequence of activation while one of the plurality of proximity sensors mounted on the back of the housing remains activated.

14. The mobile device of claim 1, further comprising an orientation sensor connected to provide signals to the processor, wherein the software held in the memory and run in the processor further causes the processor to detect a pattern of contacts on the housing from the signals from the orientation sensor, wherein the processor determines the configuration of activated proximity sensors after detecting the pattern of contacts on the housing.

15. The mobile device of claim 14, wherein the pattern of contacts is a plurality of sets of multiple contacts.

16. The mobile device of claim 14, further comprising an ambient light detector connected to provide signals to the processor, wherein the software held in the memory and run in the processor further causes the processor to determine a light level from the signals from the ambient light detector, wherein the processor determines the configuration of activated proximity sensors after determining the light level is less than a threshold.

17. The mobile device of claim 1, wherein the configuration of activated proximity sensors includes at least one proximity sensor is activated on both the first side and the second side, and the processor controls the mobile device to wake up.

18. The mobile device of claim 1, wherein the configuration of activated proximity sensors includes no proximity sensor being activated, and the processor controls the mobile device to enter low power mode.

19. The mobile device of claim 1, wherein the software held in the memory and run in the processor controls at least one of controlling a telephony operation, controlling a music player, and providing status information of the mobile device.

20. The mobile device of claim 1, wherein the software held in the memory and run in the processor controls the mobile platform by launching one of a camera application and a short message service (SMS) application when the at least one proximity sensor mounted on the first side and at least one proximity sensor mounted on the second side are activated.

21. The mobile device of claim 20, wherein the activated at least at least one proximity sensor mounted on the first side comprises a first proximity sensor mounted on the first side near the top side and a second proximity sensor mounted on the first side near the bottom side, and the activated at least at least one proximity sensor mounted on the second side comprises a third proximity sensor mounted on the second side near the top side and a fourth proximity sensor mounted on the second side near the bottom side.

22. The mobile device of claim 20, wherein the activated at least at least one proximity sensor mounted on the first side comprises a first electrode mounted on the first side near the top side and a second electrode mounted on the first side near the bottom side, and the activated at least at least one proximity sensor mounted on the second side comprises a third electrode mounted on the second side near the top side and a fourth electrode mounted on the second side near the bottom side.

23. The mobile device of claim 20, wherein the activated at least at least one proximity sensor mounted on the first side and at least one proximity sensor mounted on the second side are activated comprises at least a first electrode mounted on the first side and a second electrode mounted on the second side.

24. The mobile device of claim 20, further comprising an orientation sensor connected to provide signals to the processor, wherein the software held in the memory and run in the processor further causes the processor to determine an orientation of the mobile device and to run the camera application in a first orientation and run the SMS application in a second orientation.

25. The mobile device of claim 20, wherein the software held in the memory and run in the processor controls the mobile device automatically capture an image after launching the camera application.

26. A method comprising:
monitoring for signals from a plurality of proximity sensors coupled to a housing of a mobile device;
analyzing signals received from the plurality of proximity sensors to determine a configuration of activated proximity sensors;
determining a power mode of the mobile device;
if the power mode of the mobile device is a lower power mode than awake, determining a function based at least in part on the configuration of activated proximity sensors and the power mode, wherein the function comprises performing a telephony operation, performing a music player operation, launching an application, performing a camera application operation, performing a texting application operation, performing an email application operation, providing status information of the mobile device or any combination thereof; and
controlling the mobile device based on the determined function.

27. The method of claim 26, further comprising analyzing signals from an orientation sensor to determine an orientation of the mobile device and wherein the determining the function further based at least in part on the orientation of the mobile device.

28. The method of claim 27, wherein the orientation of the mobile device is determined to be approximately vertical and the configuration of activated proximity sensors indicates that the mobile device is held near two or more corners of the mobile device, and the function is a camera application.

29. The method of claim 28, further comprising automatically capturing an image after running the camera application.

30. The method of claim 27, wherein the orientation of the mobile device is determined to be approximately horizontal and the configuration of activated proximity sensors indicates that the mobile device is held near two or more corners of the mobile device, and the function is a short message service application.

31. The method of claim 26, the housing including a front, a back, a first side, a second side, a top side and a bottom side with a display mounted on the front and wherein a first proximity sensor is mounted on the front of the housing and a second proximity sensor is mounted on the back of the housing.

32. The method of claim 31, the method further comprising determining a position of the mobile device carried in a pocket by a user based on the configuration of activated proximity sensors being the first proximity sensor or the second proximity sensor.

33. The method of claim 32, wherein controlling the mobile device comprises automatically performing a predefined function in response to an incoming call or message based on the position of the mobile device.

34. The method of claim 32, wherein proximity sensors are mounted on the first side and the second side, wherein the configuration of activated proximity sensors does not include the proximity sensors mounted on the first side and the second side.

35. The method of claim 32, wherein there is a plurality of proximity sensors mounted on the back of the housing, wherein analyzing signals comprises analyzing signals received from the plurality of proximity sensors on the back of the housing and determining a sequence of activation of the plurality of proximity sensors mounted on the back of the housing.

36. The method of claim 35, wherein determining a sequence of activation of the plurality of proximity sensors mounted on the back of the housing is performed while one of the plurality of proximity sensors mounted on the back of the housing remains activated.

37. The method of claim 35, further comprising detecting a pattern of contacts on the housing before analyzing signals received from the plurality of proximity sensors on the back of the housing.

38. The method of claim 37, wherein the pattern of contacts is a plurality of sets of multiple contacts detected by an orientation sensor.

39. The method of claim 35, wherein the signals from the plurality of proximity sensors mounted on the back of the housing are generated by sensing a gesture performed by a finger.

40. The method of claim 39, wherein the plurality of sensors detect finger movement through a protective element.

41. The method of claim 40, wherein the protective element is a pocket of a garment or a mobile device holder.

42. The method of claim 35, further comprising detecting an ambient light level and determining that the ambient light level is below a threshold before analyzing signals received from the plurality of proximity sensors on the back of the housing.

43. A system for controlling an operation of a mobile device comprising:
  means for capacitively sensing a proximity of an object to a housing of the mobile device, the means for capacitively sensing being located at multiple locations on the housing including a first side, a second side, and a back side;
  means for determining a configuration of the means for capacitively sensing that are activated by the proximity of the object to the housing;
  means for determining a power mode of the mobile device;
  if the power mode of the mobile device is a lower power mode than awake, means for determining a function to be performed by the mobile device based at least in part on the configuration and the power mode, wherein the function comprises performing a telephony operation, performing a music player operation, launching an application, performing a camera application operation, performing a texting application operation, performing an email application operation, providing status information of the mobile device or any combination thereof;
  means for controlling mobile device based on the determined function.

44. The system of claim 43, wherein the means for capacitively sensing comprises a plurality of proximity sensors.

45. The system of claim 43, wherein the object is one of a hand and fingers.

46. The system of claim 43, wherein the configuration of the means for capacitively sensing is determined to be at corners of the housing and the function is one of a camera application and a short message service (SMS) application.

47. The system of claim 46, further comprising a means for determining an orientation of the mobile device, wherein the function is the camera application in a first orientation and the SMS application in a second orientation.

48. The system of claim 46, further comprising a means for automatically capturing an image after running the camera application.

49. The system of claim 43, wherein the means for determining a configuration of the means for capacitively sensing determines a sequence of activation of a plurality of the means for capacitively sensing mounted on the back of the housing and the function is based on the sequence of activation.

50. The system of claim 49, further comprising a means for detecting a pattern of contacts on the housing, wherein the means for determining the configuration determines the configuration after the means for detecting a pattern of contacts detects the pattern of contacts.

51. The system of claim 50, wherein the wherein the pattern of contacts is a plurality of sets of multiple contacts.

52. A non-transitory computer-readable medium including program code stored thereon, comprising:
  program code to analyze signals received from a plurality of proximity sensors coupled to a housing of a mobile device to determine a configuration of activated proximity sensors;
  program code to determine a power mode of the mobile device;
  if the power mode of the mobile device is a lower power mode than awake, program code to determine a function based at least in part on the configuration of activated proximity sensors and the power mode, wherein the function comprises performing a telephony operation, performing a music player operation, launching an application, performing a camera application operation, performing a texting application operation, performing an email application operation, providing status information of the mobile device or any combination thereof; and
  program code to automatically run the determined function on the mobile device.

53. The computer-readable medium of claim 52, further comprising program code to analyze signals from an orientation sensor to determine an orientation of a mobile device and wherein the program code to determine the function further based at least in part on the orientation of the mobile device.

54. The computer-readable medium of claim 53, wherein the orientation of the mobile device is determined to be approximately vertical and the configuration of activated proximity sensors indicates that the mobile device is held near two or more corners of the mobile device, and the function is a camera application.

55. The computer-readable medium of claim 53, wherein the orientation of the mobile device is determined to be approximately horizontal and the configuration of activated proximity sensors indicates that the mobile device is held near two or more corners of the mobile device, and the function is a short message service application.

56. The mobile device of claim 1, wherein the configuration of activated proximity sensors comprises at least a set of paired proximity sensors.

57. The mobile device of claim 1, further comprising a low power controller coupled to the plurality of proximity sensors, wherein the power mode of the mobile device is determined based at least in part on the low power controller.

\* \* \* \* \*